United States Patent [19]

Kempter

[11] Patent Number: 4,535,468

[45] Date of Patent: Aug. 13, 1985

[54] IMAGE CONVERTED FOR X-RAY EQUIPMENT AND THE LIKE

[75] Inventor: Karl Kempter, Munich, Fed. Rep. of Germany

[73] Assignee: Siemens Aktiengesellschaft, Berlin and Munich, Fed. Rep. of Germany

[21] Appl. No.: 535,458

[22] Filed: Sep. 23, 1983

[30] Foreign Application Priority Data

Sep. 29, 1982 [DE] Fed. Rep. of Germany ....... 3236137

[51] Int. Cl.³ .......................... G01T 1/24; H01L 31/10
[52] U.S. Cl. ......................................... 378/31; 378/28; 430/57
[58] Field of Search ....................... 430/69, 62, 55, 85, 430/54, 31, 57; 378/28, 31

[56] References Cited

U.S. PATENT DOCUMENTS

| | | | |
|---|---|---|---|
| 3,069,551 | 12/1962 | Haine | 250/213 |
| 3,975,635 | 8/1976 | Lennon | 378/28 X |
| 4,249,078 | 2/1981 | Lange et al. | 378/28 OR |
| 4,268,750 | 5/1981 | Cowart | 250/315.1 |
| 4,286,033 | 8/1981 | Neyhart et al. | 430/57 |
| 4,370,398 | 1/1983 | Sato | 430/57 X |
| 4,377,628 | 3/1983 | Ishioka et al. | 430/84 X |

FOREIGN PATENT DOCUMENTS

| | | |
|---|---|---|
| 2141934 | 3/1973 | Fed. Rep. of Germany . |
| 2932174 | 2/1981 | Fed. Rep. of Germany . |
| 127561 | 3/1979 | Japan ............... 430/57 |
| WO80/02603 | 5/1980 | PCT Int'l Appl. . |

OTHER PUBLICATIONS

"A Method of Electronic Readout of Electrophotographic and Electroradiographic Images", Korn et al., Journal of Applied Photographic Engineering, pp. 178 to 182.

Shimizu et al., J. Appl. Phys. 51(12), Dec. 1980, pp. 6422-6423.

Primary Examiner—John L. Goodrow
Attorney, Agent, or Firm—Mark H. Jay

[57] ABSTRACT

The invention relates to a photographic apparatus useable, for example, in medical radiodiagnostics, with a three-layer system lying between two electrodes, to which a d-c voltage is applied. The two outer layers are photoconductors and the middle layer consists of a material in which charge carriers can be stored. An image radiated from one side can be read out from the other side in the form of an electric pulse sequence by scanning by means of a light beam and can be reproduced on a television screen. The invention provides a storage layer which has areas in which charge carriers adhere and that on the side of the system on which the image is radiated in the electrode has the same polarity as the charge carriers for which the storage layer has traps.

21 Claims, 1 Drawing Figure

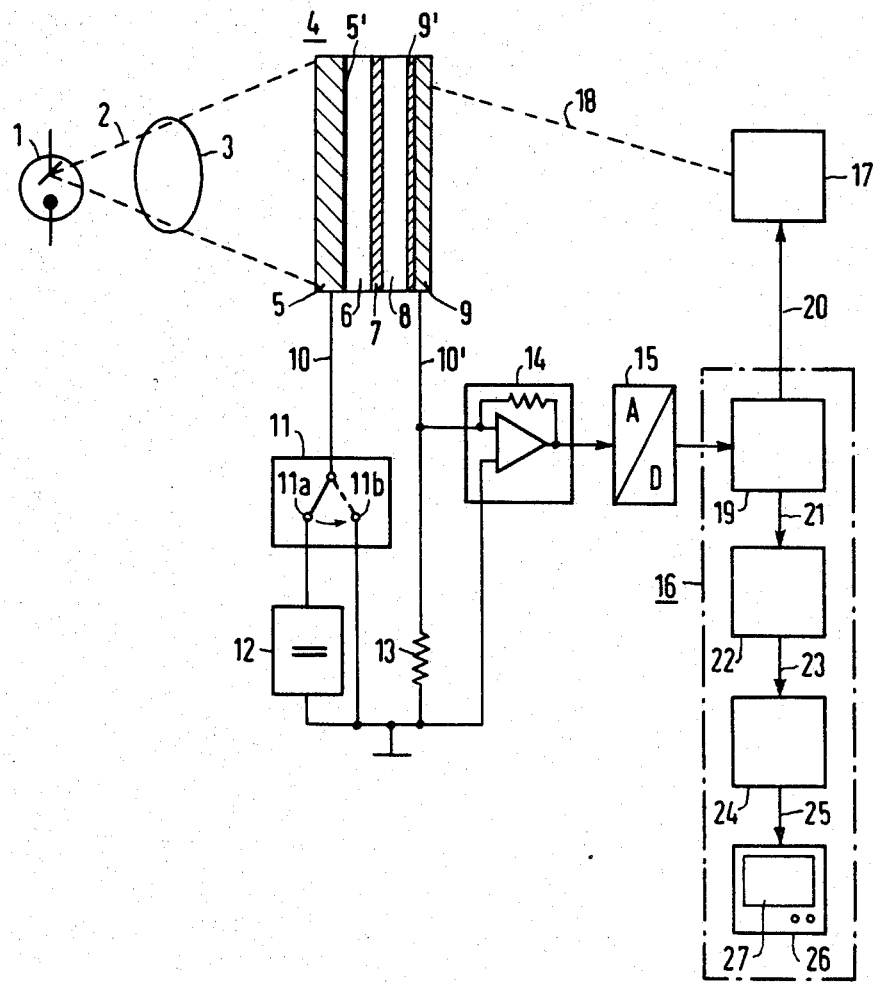

IMAGE CONVERTED FOR X-RAY EQUIPMENT AND THE LIKE

BACKGROUND OF THE INVENTION

The invention relates to a photographic apparatus, for use in medical radiodiagnostics, which utilizes a 3-layer system lying between two electrodes which are energized with a d-c voltage. The three layers consist of a material in which charge carriers can be stored sandwiched between two photoconductors.

The "Journal of Applied Photographic Engineering", Vol. 4, No. 4, 1978, pages 178–182, discloses photographic apparatus in which a double layer, consisting of a selenium layer in an electrically insulating layer is used. The two layers are between the bottom electrodes and a transparent covering electrode. In every case the selenium layer must simultaneously fulfill two functions. For absorption of the roentgen radiation, i.e., for taking X-ray pictures, the selenium should be as thick as possible. However, for loss-free charge carrier transport in the point-by-point scanning with a light beam during read-out of the signal it should be as thin as possible. Consequently, the attainable signal strength and the read-out time necessary for the generation of the signal are inferior as a result of this selenium layer.

When this photographic principle is used in medical radiodiagnostics, the X-ray dose is limited to protect the patient. When photographing with such a limited dose, however, the selenium layer discharges by only about 10%. Accordingly another disadvantage results from the proposed read-out principle. During read-out complete discharge with light takes place, so that the preceding X-ray exposure appears only as a small differential signal against the strong signal background present due to the charge.

U.S. Pat. No. 3,069,551 discloses a system consisting of several layers in which a photoconductor layer sensitive to light as well as one sensitive to X-rays abut a mosaic layer with charge storage capacity. Such an arrangement has the disadvantage, however, that such a mosaic layer which is sufficiently homogeneous for radiodiagnostics is not available.

To obtain a strong video signal with an improved noise ratio, for the system disclosed in U.S. Pat. No. 3,069,551, a homogeneous electrically insulating layer, in accordance with German patent application 3151155.4, can be placed between the X-ray photoconducting layer and the light photoconducting layer in place of the mosaic. In this arrangement the charge carriers are generated by the radiation to be imaged and they must be retained for storage at the photoconductor-insulator interface. However, production of interfaces with equal properties is technologically difficult and therefore, this approach is not practical. Upon read-out, the charge carriers from the light photoconductor layer cannot neutralize the charge carriers stored in the form of images in mere traps, because the insulating layer lies therebetween and by definition does not transmit any charge carriers. To prevent the formation of ghost images in subsequent takes, an effective erasing process must be carried out after each take.

SUMMARY OF THE INVENTION

It is the object of the invention to provide photographic apparatus which produces a strong video signal with an improved signal-to-noise ratio, reproducibly of the storing traps, and simple erasing of the stored charge images.

In general, the invention features photographic apparatus having two transparent electrodes extending over an area and connected to d-c voltage, and two solid substance layers, located between the electrodes and in direct contact with the electrodes, whose free surfaces abut a charge storage layer, wherein the first solid substance layer is a photoconductive layer which receives the image beams, and the second is a photoconductive layer which receives an optical ray moved in a scanning raster, wherein the storage layer includes a material which has areas in which charge carriers adhere; and the electrode connected to the first conductive layer has the same polarity as the charge carriers for which the storage layer has traps.

In preferred embodiments of the photographic apparatus, the storage layer with charge carrier traps includes arsenic and sulfur; the storage layer with charge carrier traps includes arsenic and selenium; the storage layer is composed of $AsS_4$; the storage layer is composed of $AsS_3$; the storage layer is composed of $As_2Se_3$; the storage layer is 0.01 microns to 10.0 microns thick; the first conducting layer is 100 microns to 500 microns thick, and has photoconduction properties when exposed to X-rays; the second photoconductor layer is 0.5 microns to 100 microns thick and exhibits photoconduction under the action of light, which can be visible, ultraviolet, or infrared light; at least one of the photoconductor layers includes selenium; 0.1 to 5% arsenic is admixed with the selenium; at least one of the two photoconductor layers includes amorphus silicon containing 1 to 30 atom percent hydrogen; a thin transparent layer, which prevents a charge carrier injection from the electrode into the photoconductor is located between at least one of the electrodes in the respective contiguous photoconductor layer; the transparent layer includes an electrically insulating, organic substance; the electrically insulating, organic substance is a polyamide; the electrically insulating, organic substance is a polymide; the transparent layer includes an inorganic material; the inorganic material is $Al_2O_3$; the inorganic material is $SiO_2$; the inorganic material is ZnS; the transparent layer is 10.0 nm to 1.0 micron thick; the storage layer is 5.0 microns to 10.0 microns thick; the first photoconductor layer is 5.0 microns to 10.0 microns thick; at least one of the photoconductor layers includes 0.5% arsenic mixed with the selenium; and the transparent layer is 100 nm thick.

Other features and advantages of the invention will be apparent in the following detailed description, and from the claims.

For a full understanding of the present invention, reference should now be made to the following description and to the accompanying drawings.

BRIEF DESCRIPTION OF THE DRAWINGS

The invention will be described in detail with reference to FIG. 1 which shows diagrammatically a preferred embodiment of the photographic apparatus.

DETAILED DESCRIPTION

Referring to FIG. 1, X-ray source 1, which produces beam 2 for irradiating patient 3, is shown. The resulting radiogram then reaches photographic arrangement 4. Arrangement 4 includes first electrode 5 which consists of a 2 mm thick aluminum support plate on which is provided oxide layer 5' for preventing charge carrier injections, first photoconductor layer 6, storage layer 7, second photoconductor layer 8, blocking layer 9' for preventing charge carrier injection, and electrode 9.

Electrodes 5 and 9 are connected via lines 10 and 10' as well as by switch 11 which has switching positions 11a and 11b. When the switch is in switching position 11a the electrodes are connected to voltage source 12 which provides 3000 volts d-c. In addition, lines 10 and 10' are connected with resistor 13 and amplifier 14. The latter is connected via analog/digital converter 15 to processor 16 for the video signals. Processor 16 is also connected with scanning device 17, from which issues fine light beam 18 that passes through electrode 9 and scans photoconductor layer 8 of photographic arrangement 4.

Processor 16 contains micro-processor 19, which receives the signal from analog/digital converter 15. Through the microprocessor a control signal is supplied via line 20 to scanning device 17 for control of the scanning motion of beam 18. In addition, the signal is sent via terminal 21 to memory 22, from which the image signal can be supplied via line 23 to computer 24. Finally, the signal passes via line 25 to television monitor 26, where it can be viewed on screen 27. In addition, line 25' can originate from computer 24 for teletransmission of the image signal.

A radiogram of patient 3 is produced in first photoconductor layer 6 by means of beam 2, because of the 3000 volts applied to electrodes 5 and 9. The release of charge carriers in layer 6, which are collected in the storage layer, results in a charge distribution which corresponds to the intensity distribution in beam 2. After X-ray source 1 has been turned off the voltage applied to electrodes 5 and 8 is shortcircuited by placing switch 11 in position 11b. Then if scanning laser beam 18 is guided over arrangement 4, beam 18 will penetrate gold electrode 9 (thickness 10 nm), blocking layer 9', which consists of zinc surfide (ZnS) (thickness 200 nm), and second photoconductor layer 8, which consists of selenium (Se) (thickness 10 microns). Beam 18 neutralizes the charge image by providing charges of opposite polarity (holes) from layer 8. This neutralizing current supplied by layer 8 results in a current proportional to it in the outer circuit, which enables an image signal sequence to get to amplifier 14 via lines 10 and 10'. After passes through converter 15 and processing in processor 16, the radiogram of patient 3 can then appear on picture screen 27 of monitor 26. The image processing and television system designated processor 16 may be designed in a manner described, for example, in "Röntgenpraxis" 6 (1981), pages 239 to 246, for digital X-ray technique, so that additional variations of brightness, contrast, and other variables of the X-ray picture become possible.

In the use of a three-layer system which is present between electrodes connected to a d-c voltage, and where the storage layer between the first and second photoconductor layers consists of a material which has areas in which the charge carriers adhere, and where the electrodes contiguous to the first photoconducting layer has the same polarity as the polarity of the charge carriers for which the storage layer has traps:

(a) The charge produced as an image from the first photoconducting layer is retained in the volume of the storage layer. The density of the traps in the volume is largely a property of the material and hence can be produced in a reproducible manner. Also, because the thickness of the storage layer is freely selectable, the total number of traps present in this layer can be adapted to the respective requirement.

(b) During read-out of the stored image, according to the stated polarity of the electrodes, charge carriers charged oppositely to the stored charge carriers migrate from the second photoconducting layer into the storage layer up to the charge carriers trapped therein, neutralizing them. In the storing of electrons the neutralization occurs through holes which migrate from the second photoconducting layer into the storage layer. This is possible only because the storage layer permits a migration of charge carriers for the neutralization of the stored charge carriers. In the invention, therefore, a complete erasing takes place already with the reading out of the stored image, so that the formation of ghost images is thereby prevented.

Concerning the strength of the read-out signal the following should be noted: Assuming that the photoconductor of the first photoconducting layer has a quantum efficiency of 100% (this condition is nearly fulfilled for selenium) and that the storage layer stores the total image charge without loss, a signal charge will be in the outer circuit which is proportional to the stored charge but is multiplied by a factor corresponding to the ratio of the thickness of the read-out layer (the second photoconductor layer) to the thickness of the entire three-layer system for spacing of the electrode.

The following is an example for taking of X-ray pictures: If the first photoconductor layer is 300 microns thick, the second photoconductor layer 10.0 microns thick and, the storage layer is 5.0 microns thick then:

$$Q_s = \frac{10}{315} \times Q = 0.03 \times Q$$

Where: Q=the stored charge and $Q_s$=the signal charge.

For taking photographs the two photoconductor layers may be thinner because of the better absorption conditions. The two photoconductor layers need to have a thickness of only 5.0 microns. Therefore, neglecting the storage layer thickness of, for example, 0.5 microns:

$$Q_s = \frac{5}{10} \times Q = 0.5 \times Q$$

This must be taken into consideration when the signal-to-noise ratio is important, because by suitable selection of the ratio of the thickness of the two photoconductor layers the signal level can be influenced directly.

The noise is determined by the current, which can be kept small when using extremely high-resistance selenium and injection barriers at the electrodes.

It has been found to be especially favorable to utilize a storage layer in which only electrons adhere and a second photoconductor layer from which holes can migrate into the storage layers. This requires, for one thing, a positively biased electrode at the second photoconductor layer and a negative one at the first. Since fast image reproduction is to be obtained, it is desirable if many points can be read out in a short time. For this to be possible, however, the holes in the second photoconductor layer must have very great mobility. This is true especially when using selenium as the material for the photoconducting layers.

When writing the image to be taken into the first photoconducting layer, electrons must be moved at the stated polarity. This mobility of the electrons in selenium is sufficiently great for them to pass through a thin first photoconductive layer, during the relatively long exposure (about 1 sec.). In addition, in a storage layer including arsenic triselenide ($As_2Se_3$), enough traps for electrons are available.

For the three-layer combination of a first photoconducting layer, storage layer for charge Q, and a second photoconducting layer, the material sequence of arsenic triselenide sandwiched between two layers of selenium is suitable.

A corresponding construction of a radiographic apparatus can be obtained by applying the layers on an electrically conducting support, such as a 0.5 mm thick plate of aluminum. The amorphous selenium layer consists of an X-ray sensitive first photoconductor layer about 300 microns thick; an electron trap and storage layer of amorphous arsenic triselenide which is 5.0 microns thick; a second light photoconductor layer of amorphous selenium which is 10.0 microns thick; and a transparent electrode consisting of gold which is 10.0 nm thick.

Between the conductive support connected to the negative pole of a 3000 volt d-c voltage source and the first selenium layer there is no injection of charge carriers into the selenium layer. The polarity also enables electrons to get into the trap and storage layer according to the amount of X-ray exposure. The great density of deep traps for electrons in the arsenic triselenide makes possible a high-fidelity storage of the negative charge pattern in this thin intermediate layer.

For read-out the second photoconductor layer, which is the thinner layer of selenium, is scanned with a sharply focused light beam in a raster pattern that is known, for example, from the technology of television photography and reproduction. Thus, point for point a conducting electric circuit path from the electrode connected to the positive pole of the voltage source to the stored charge image is obtained. The current pulse in the outer circuit or also the entire charge flowing in the read-out circuit is proportional to the local charge stored by X-ray exposure.

During read-out by going through the raster, voltages of the same polarity is applied to the multi-layer system as under X-ray exposure either by voltage applied from outside or, under shortcircuit in outer circuit, by the potential deriving from the stored charge. Due to this, only the holes (defect electrons) run in the photoconducting selenium layer toward the trap layer, to neutralize the negative charge pattern. As a result of the great hole mobility in amorphous selenium of $1.4 \times 10^{-1}$ cm$^2$/Vs (where V=volt and s=second), read-out of the stored charge through the thin photoconducting layer according to the invention is indeed possible within a few microseconds per image point.

By the use of selenium and arsenic triselenide, the necessary prerequisites for homogeneous and defined charge storage, rapid read-out and a small dark current (noise signal) are obtained. For one thing, both materials can be produced extremely homogeneously in the form of layers, as is known from the corresponding technology for the production of xerographic layers. For another, the dark current, which is determined by the semiconductor (i.e. the selenium) is extremely small. Amorphous selenium has the greatest dark resistance of all amorphous photoconductors presently known.

The construction of the layers of the above mentioned materials can be effected in a tried and low cost manner, and also in large areas by vapor deposition under vacuum. The layers of selenium and or arsenic triselenide ($As_2Se_3$) are easily manufactured in this manner because they can be precipitated in accordance with the compatible technology of vapor application, in the same installation.

The coating of relatively large areas with a transparent electrode, for instance of indium-tin oxide or a thin gold layer, can be produced by means of vapor depositing installations currently available.

To stabilize the amorphous phase of the selenium, it is advisable to admix with the vaporizer material 0.5 percent by weight arsenic. Also, deviations from the stoichiometry of arsenic triselenide according to $As_2Se_3$, may have an advantageous effect. Thereby, an increase of the density of the traps can improve the storage capacity of the layer produced therefrom.

To prevent charge carriers from being injected into the photoconducting layers from one of the electrodes, it is desirable to provide a thin blocking layer between the electrode and the photoconductor layer. When using selenium as the material for the second photoconductor layer, zinc sulfide (ZnS) or an organic insulator that is easy to apply can be used for the blocking layer. The main requirement for these blocking layers is that they effectively prevent an injection precisely of that charge carrier type whose polarity is connected to the corresponding electrode during the take. The material must be stable in time and it should be applied homogeneously because local deviations may become visible.

There has been shown and described novel photographic apparatus which fulfills all the objects and advantages sought. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In X-ray exposure apparatus having two transparent electrodes extending over an area and connected to a d-c voltage which is on the order of 3000 volts, and first and second solid substance layers, located between the electrodes and in direct contact with the electrodes, whose free surfaces abut a charge storage layer, wherein the first solid substance layer is a photoconductive layer which is 100 to 500 microns thick and receives the image beams, and the second solid substance layer is a photoconductive layer which receives an optical ray imaged in a scanning raster, the improvement comprising:
   (a) said storage layer comprising arsenic and sulphur, having traps for charge carriers, and being 0.01 to 10.0 microns thick, and
   (b) said electrode connected to said first solid substance layer has the same polarity as the charge carriers which are trapped by the storage layer.

2. The photographic apparatus according to claim 1, wherein said storage layer comprises $AsS_4$.

3. The photographic apparatus according to claim 1, wherein said storage layer comprises $As_2S_3$.

4. The photographic apparatus according to claim 1, wherein at least one of said photoconductor layers comprises selenium.

5. The photographic apparatus according to claim 4, wherein 0.1 to 5.0% arsenic is admixed with said selenium.

6. The photographic apparatus according to claim 1, wherein at least one of said two photoconductor layers comprises amorphous silicon containing 1 to 30 atom percent hydrogen.

7. The photographic apparatus according to claim 1, further comprising a thin transparent layer, which prevents a charge carrier injection from said electrode into said photoconductor, located between at least one of said electrodes and said respective contiguous photoconductor layer.

8. The photographic apparatus according to claim 7, wherein said transparent layer comprises an electrically insulating, organic substance.

9. The photographic apparatus according to claim 8, wherein said electrically insulating, organic substance is a polyamide.

10. The photographic apparatus according to claim 8, wherein said electrically insulating, organic substance is a polyimide.

11. The photographic apparatus according to claim 7, wherein said transparent layer comprises an electrically insulating, inorganic material.

12. The photographic apparatus according to claim 11, wherein said inorganic material is $Al_2O_3$.

13. The photographic apparatus according to claim 11, wherein said inorganic material is $SiO_2$.

14. The photographic apparatus according to claim 11, wherein said inorganic material is ZnS.

15. The photographic apparatus according to claim 7, wherein said transparent layer is 10.0 nm to 1.0 micron thick.

16. The photographic apparatus according to claim 1, wherein said said storage layer is 0.5 microns to 1.0 microns thick.

17. The photographic apparatus according to claim 1, wherein said first photoconductive layer is 5.0 microns to 10.0 microns thick.

18. The photographic apparatus according to claim 4, wherein 0.5% arsenic is mixed with said selenium.

19. The photographic apparatus according to claim 7, wherein said transparent layer is 100 nm thick.

20. In X-ray exposure apparatus having two transparent electrodes extending over an area and connected to a d-c voltage which is on the order of 3000 volts, and first and second solid substance layers, located between the electrodes and in direct contact with the electrodes, whose free surfaces abut a charge storage layer, wherein the first solid substance layer is a photoconductive layer which is 100 to 500 microns thick and receives the image beams, and the second solid substance layer is a photoconductive layer which receives an optical ray imaged in a scanning raster, the improvement comprising:

(a) said storage layer comprising arsenic and selenium, and having traps for charge carriers, and being 0.01 microns to 10.0 microns thick; and (b) said electrode connected to said first solid substance layer has the same polarity as the charge carriers which are trapped by the storage layer.

21. The photographic apparatus according to claim 20, wherein said storage layer comprises $As_2Se_3$.

* * * * *